United States Patent [19]
Berry, III

[11] Patent Number: 5,851,087
[45] Date of Patent: Dec. 22, 1998

[54] SELF-CLEANING INTAKE SCREEN

[76] Inventor: Russell M. Berry, III, 2153 Alamos, Clovis, Calif. 93611

[21] Appl. No.: 745,077

[22] Filed: Nov. 7, 1996

[51] Int. Cl.$^6$ ................................................ B01D 33/06
[52] U.S. Cl. ........................ 405/127; 210/154; 210/269; 210/161
[58] Field of Search .................... 405/127; 210/154–158, 210/161

[56] References Cited

U.S. PATENT DOCUMENTS

| | | | |
|---|---|---|---|
| 578,179 | 3/1897 | Wolford | 210/397 |
| 628,517 | 7/1899 | Bliss et al. | 210/107 |
| 969,364 | 9/1910 | Grootenhuis | 210/354 |
| 1,210,759 | 1/1917 | Breddin | 210/156 |
| 2,013,971 | 9/1935 | Raisch | 210/415 |
| 2,022,336 | 11/1935 | Bower | 210/157 |
| 2,136,853 | 11/1938 | Knecht | 210/415 |

OTHER PUBLICATIONS

Custom Technology Co., Inc., specification sheet for Self Cleaning Suction Screen.
Claude Laval Corp., Product Description brochure for Self–Cleaning Pump Intake Screens.

*Primary Examiner*—Tamara L. Graysay
*Assistant Examiner*—Tara L. Mayo
*Attorney, Agent, or Firm*—Limbach & Limbach L.L.P.

[57] ABSTRACT

A conical intake screen which is self-cleaned by using four elongate brushes which are slowly driven over its surface by a submersible, programmable electric motor. The invention is preferably placed in the waterway with the axis of the conical screen oriented in the vertical direction. As the rearwardly angled brushes move over the screen, the brush angle and gravity tend to force the debris downward until it falls from the edge of the device. Further, a cleaning brush is placed within the surface of the conical screen with its bristles extending slightly above the surface of the screen. In this manner each screen sweeper engages the brush cleaner once each rotation, which action tends to dislodge debris from the bristles of the sweeper brushes. The programmable motor will typically make three counterclockwise revolutions, one clockwise revolution, and then stop for a selectable interval of from 15 minutes to 3 hours, although continuous action is also an option. The device may be solar powered so it can operate for extended periods in remote areas unattended.

5 Claims, 9 Drawing Sheets

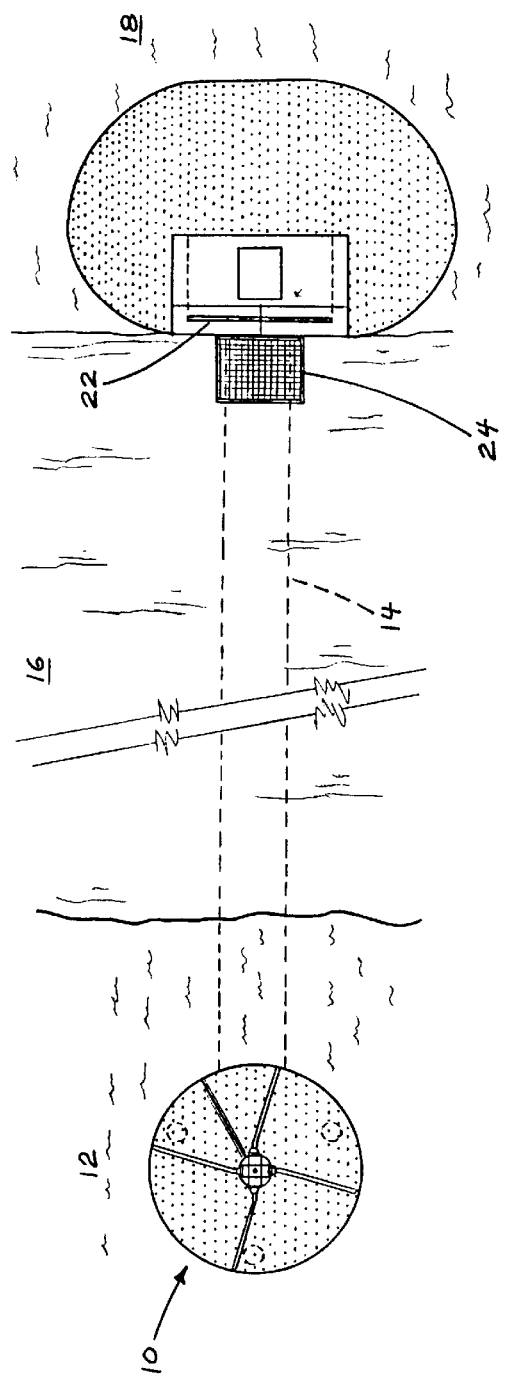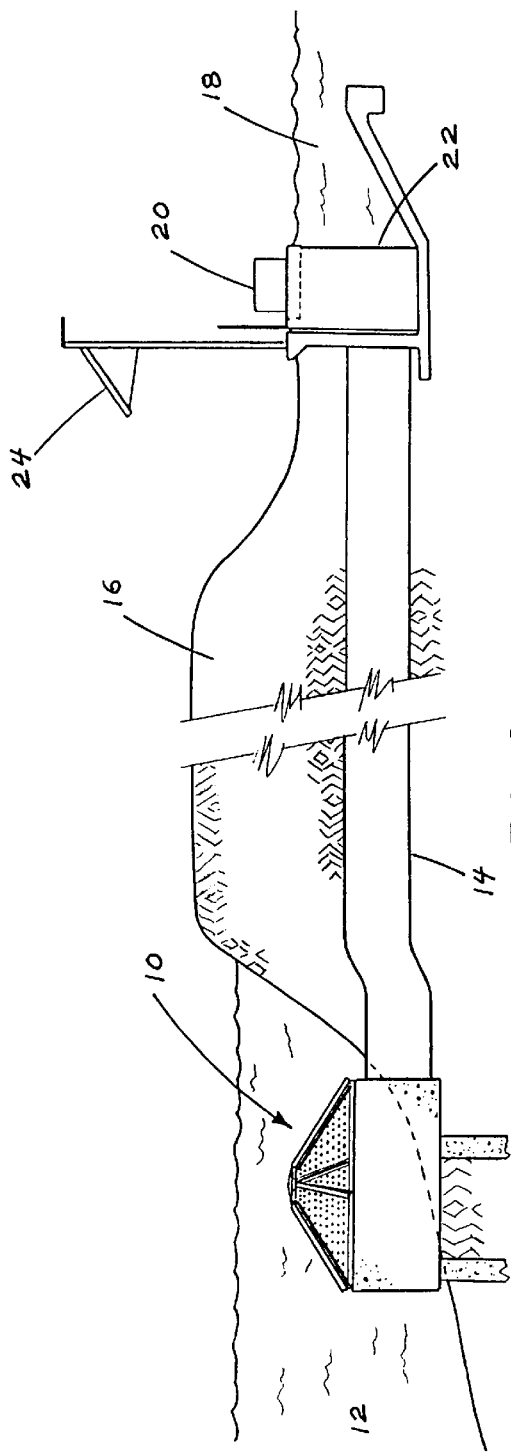

SELF-CLEANING INTAKE SCREEN

CROSS-REFERENCE TO RELATED APPLICATIONS

Not Applicable.

STATEMENT REGARDING FEDERALLY SPONSORED RESEARCH OR DEVELOPMENT

Not Applicable.

AUTHORIZATION PURSUANT TO 37 C.F.R. §1.71 (d) (e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to intake screens to exclude fish and debris from entering a water inlet, and is particularly directed to a self-cleaning intake screen.

2. Description of Related Art

Self-cleaning intake screens are well known in the art. The earliest of such devices simply employed some mechanism to cause the screen, generally cylindrical in shape, to rotate within the stream or waterway. As the screen rotated, any debris trapped on its upstream side would be washed away as it turned downstream. More sophisticated devices employ some sort of backwash system which, either continually or at periodic intervals, spray a high pressure jet of water or air against the inside of the screen in an attempt to blow debris off of and away from the screen.

BRIEF SUMMARY OF THE INVENTION

The present invention discloses a conical intake screen which is self-cleaned by means of four elongate brushes which are slowly driven over its surface by a submersible, programmable electric motor. The invention is preferably placed in the waterway with the axis of the conical screen vertical. As the rearwardly angled screen sweepers move over the screen, the brush angle and gravity tend to force the debris downward until it falls from the edge of the device. Further, a brush cleaner is placed within the surface of the conical screen with its bristles extending slightly above the surface of the screen. In this manner each screen sweeper engages the brush cleaner once each rotation, which action tends to dislodge debris from the bristles of the sweeper brushes, permitting it to be carried away by the current. The programmable motor might, for example, make three counterclockwise revolutions, one clockwise revolution, and then stop for a selectable interval of from 15 minutes to 3 hours, although continuous cleaning is also an option. The device may be solar powered so it can operate unattended for extended periods in remote areas

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein:

FIG. 1 is a top plan view of the invention in place in a waterway and providing filtered water through a levee to a commercial utility or agricultural canal;

FIG. 2 is a side view in partial section of that shown in FIG. 1;

DETAILED DESCRIPTION OF THE INVENTION

Figure 3:
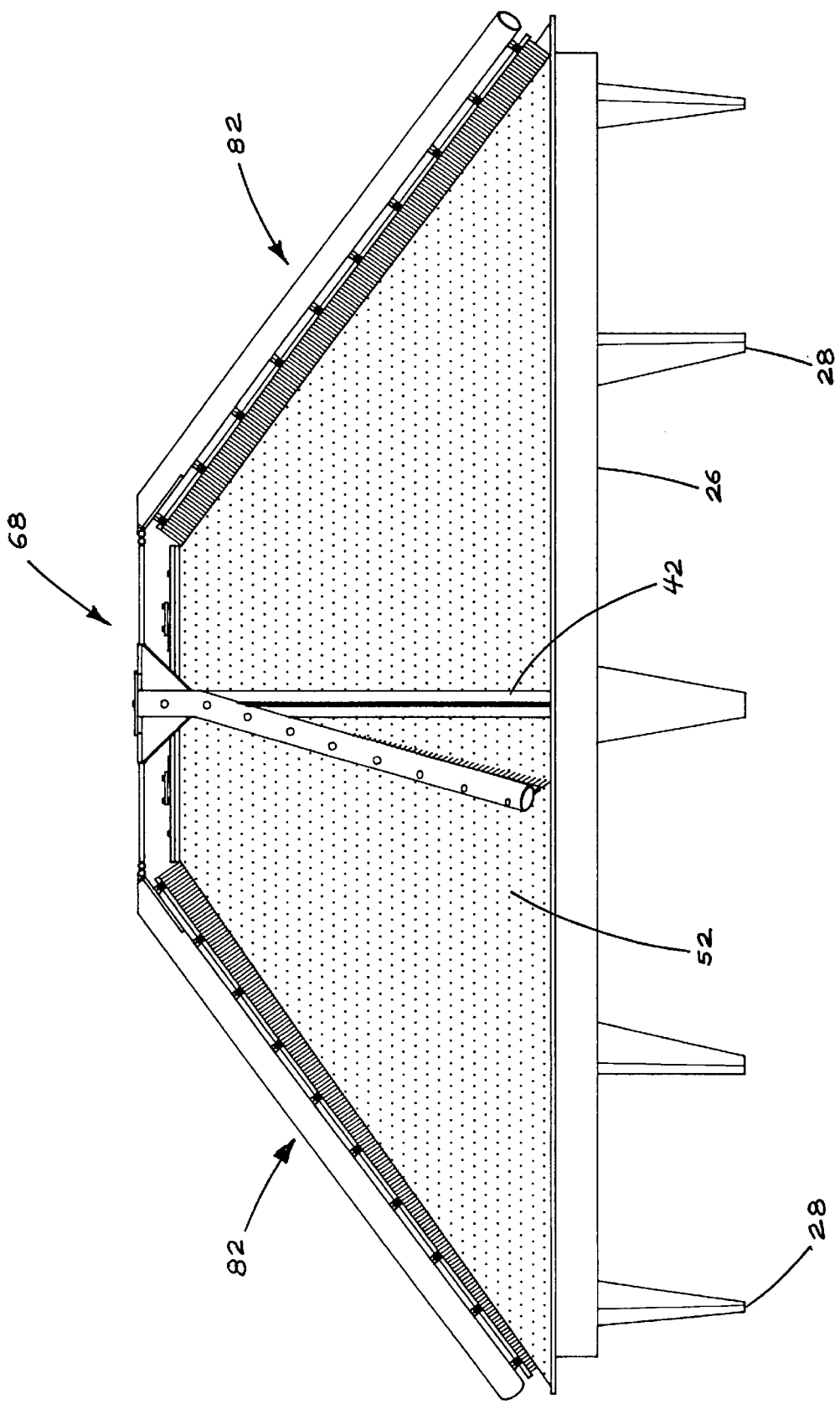
FIG. 3 is a side elevational view of the invention.

Referring now to the drawings, wherein like reference numerals designate identical or corresponding parts throughout the several views, FIG. 1 and FIG. 2 show the invention depicted generally at 10 where it is submerged within a waterway 12 to provide filtered water through a pipe 14 which runs through a levee 16 to a canal 18 or pipe for further distribution. The water level in the canal is monitored by a controller 20 which raises and lowers a gate 22 to adjust the water flow. Such devices are often powered by a solar panel 24 for operation in remote areas.

Figure 4:
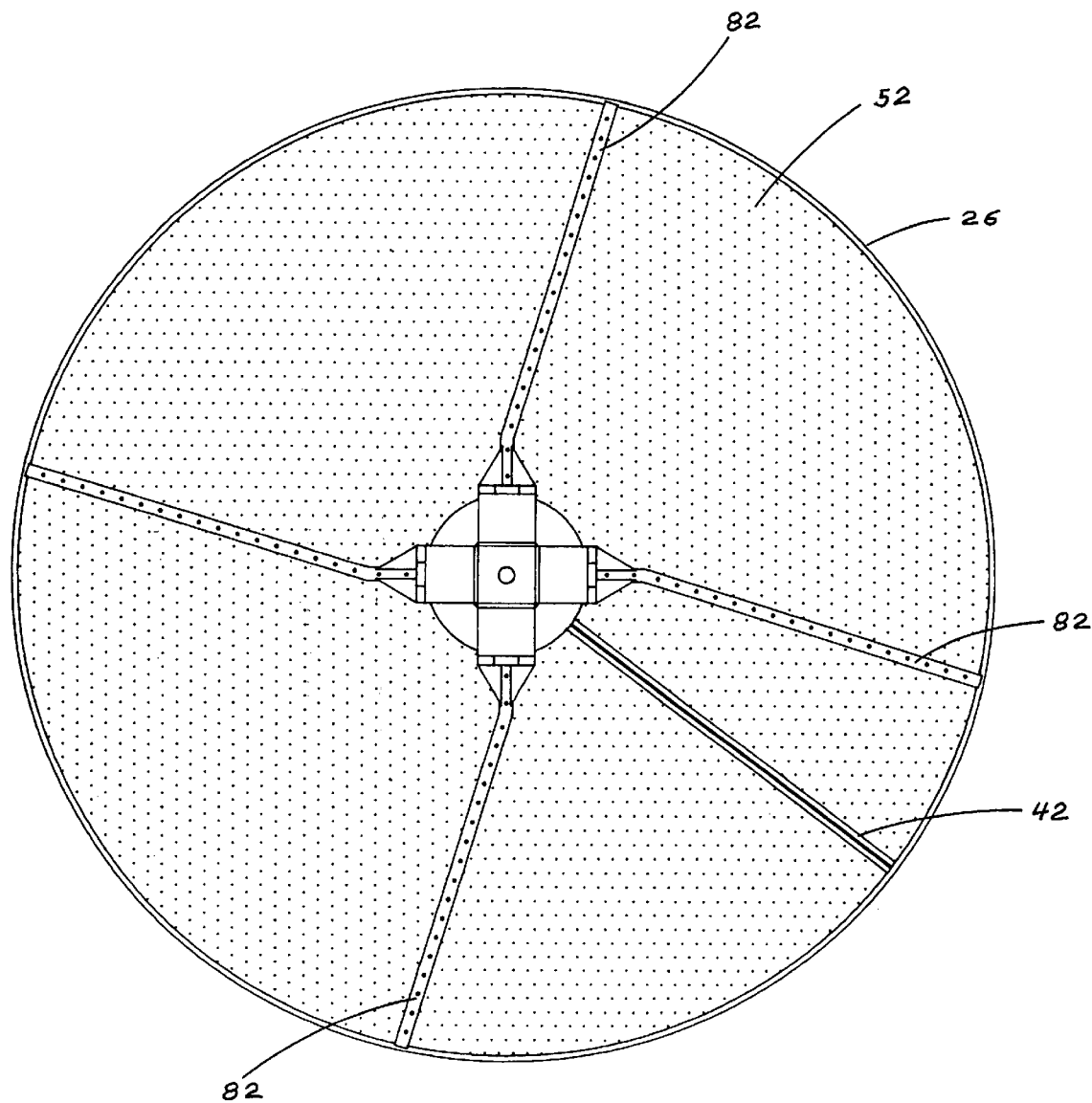
FIG. 4 is a top plan view of the invention.
Figure 5:
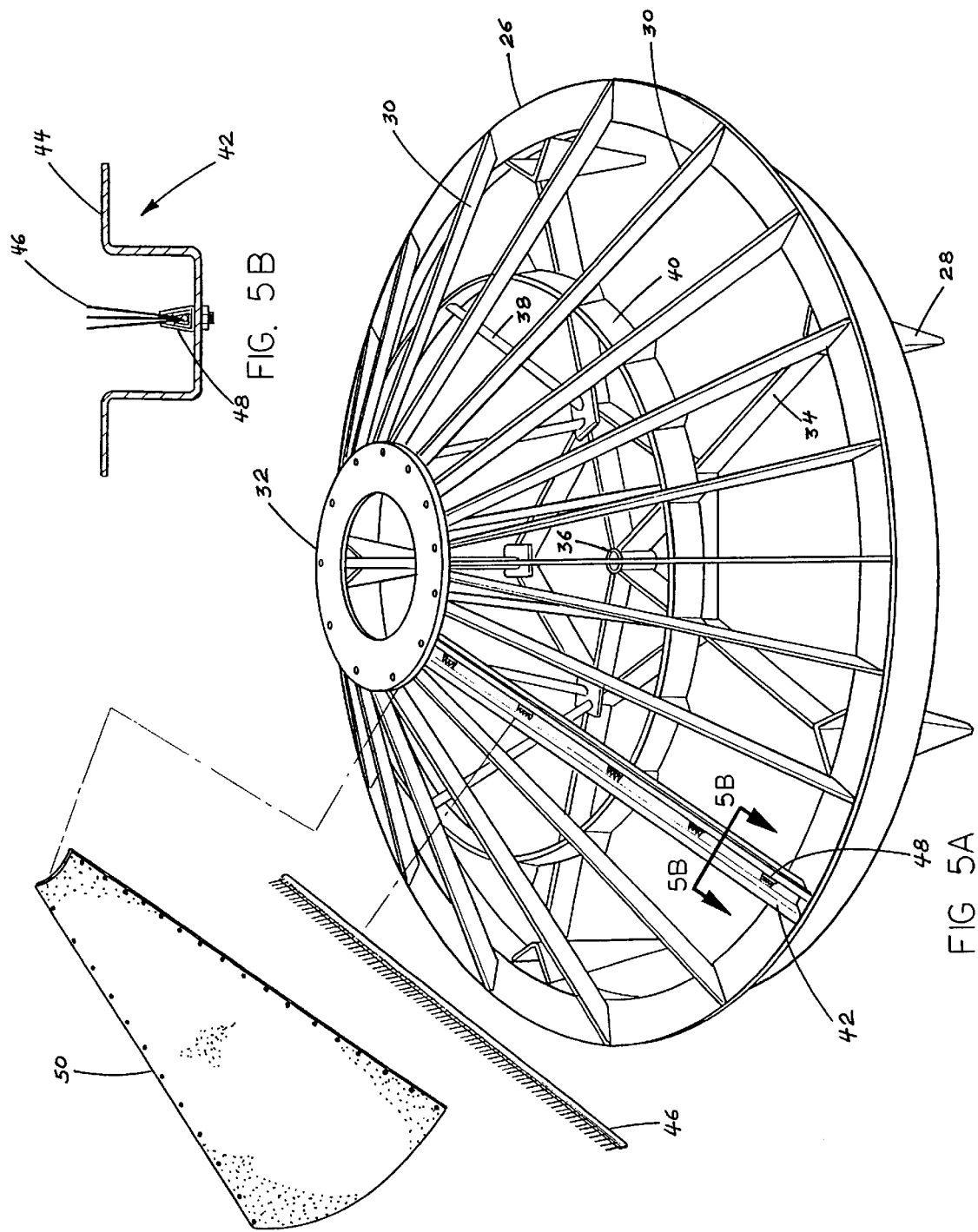
FIG. 5A is a perspective view of the conical support structure of the invention, one screen section, and the brush cleaner.
FIG. 5B is a sectional view of the brush cleaner taken along line 5B—5B of FIG. 5A.

Referring now primarily to FIGS. 3, 4, and 5A, the invention 10 is preferably fabricated from stainless steel and is seen to comprise a circular, inverted-L-shaped base 26 with a series of legs 28 welded to its interior surface and extending downward and inwardly therefrom. Welded to and extending upward and inward at a 35 degree angle from the circular base 26 is a series of spaced studs 30 which are welded to and support a circular cap plate 32. For additional support, the circular base 26 has a series of five spokes 34 extending from a central hub 36 and welded to the interior of the circular base 26. These spokes 34 support a series of upwardly angled tubes 38, which in turn support a stud support ring 40, welded to the lower side of the studs 30, and the cap plate 32. Also extending between the circular base 26 and the cap plate 32 is a brush cleaner 42. Referring also to FIG. 5B, the brush cleaner 42 is seen to comprise an elongate, U-shaped member 44 with an elongate cleaning brush 46 secured therein and extending upward therefrom. The cleaning brush 46 is secured within the U-shaped member 44 by means of a plurality of brush holders 48. The brush holders 48 are familiar to those in the art and are simply clamps which are bolted within the U-shaped member 44 and then closed over the channel of the brush 46.

Secured to the outer edges of the studs 30, preferably by riveting, is a plurality of perforated plate sections 50 which extend between the cap plate 32 and the circular base 26 to form a conical intake screen 52 as depicted in FIGS. 3 and 4. The perforated plate preferably has a hole diameter of from 3/32 inch to 1/4 inch. Also depicted in FIGS. 3 and 4 is the brush cleaner 42, with the bristles of the cleaning brush 46 extending approximately 1/4 inch above the surface of the intake screen 52 through a gap left between adjacent perforated plate sections 50 which are riveted to the edges of the U-shaped member 44. The cleaning brush 46, the function of which will be described below, preferably has 0.060 inch diameter nylon bristles.

Figure 6:
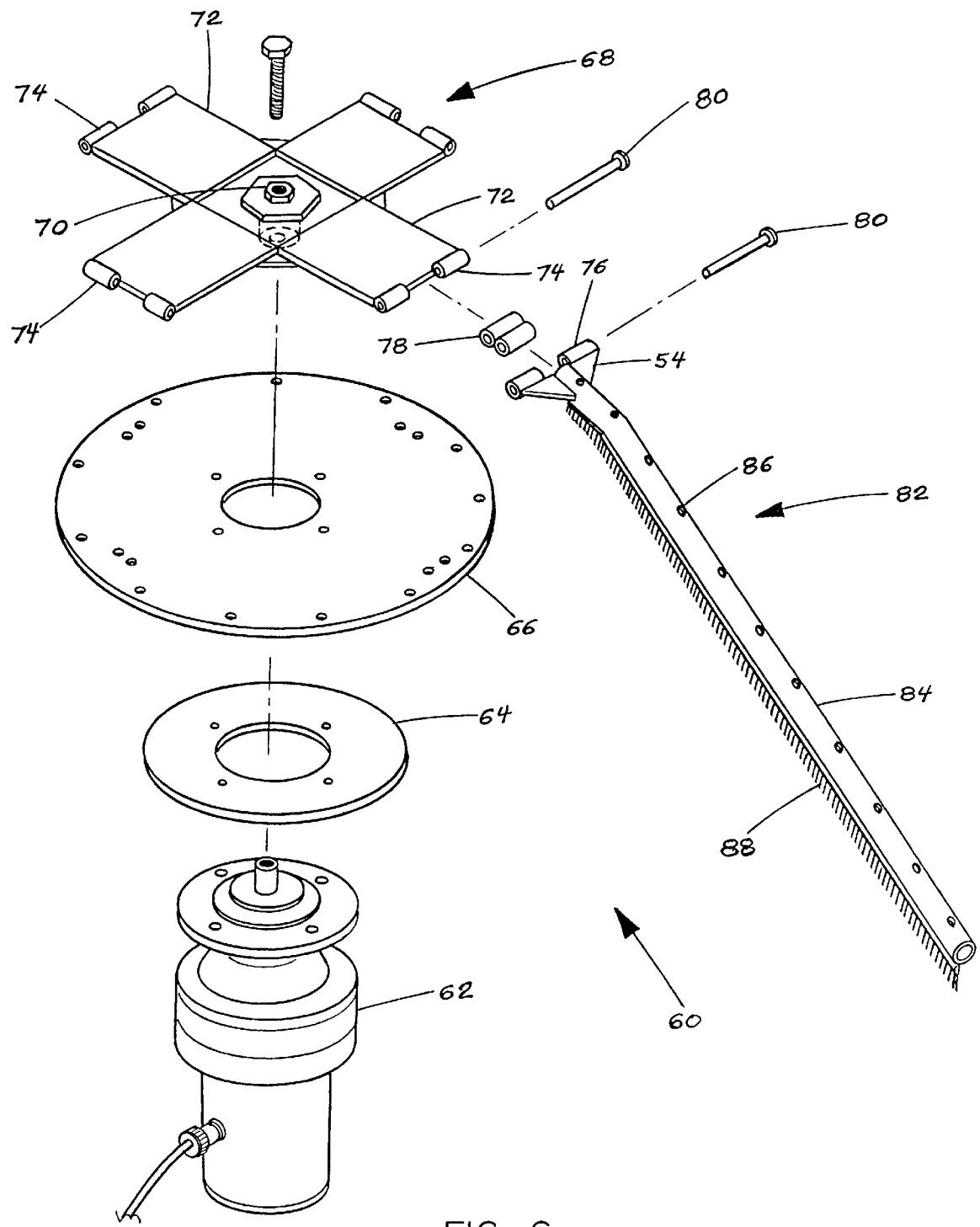
FIG. 6 is an exploded view of the screen sweeping assembly of the invention.
Figure 7:
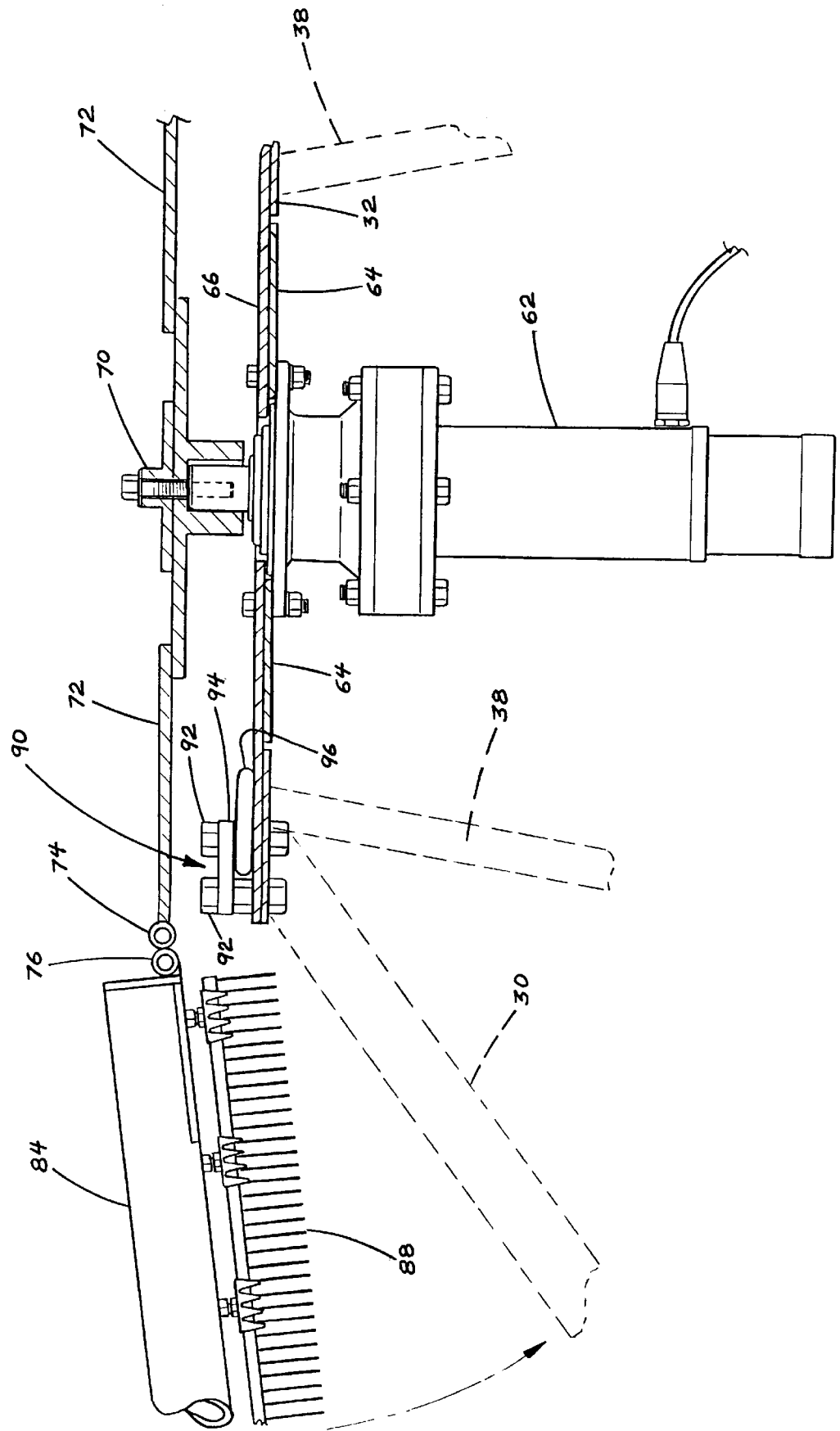
FIG. 7 is a side view, in partial section, of the drive mechanism and screen sweepers of the invention.

Referring now primarily to FIGS. 6 and 7, the screen sweeping assembly 60 is seen to include a motor 62, a reinforcement plate 64, and a motor plate 66, the three of which are attached together by bolts (not shown) and then secured to the cap plate 32 (FIG. 5A) by bolts (also not shown). The preferred motor 62 is a submersible, high torque, low speed gear reduction motor with programmable operating modes available from Empire Magnetics, Inc. The sweeping assembly 60 also includes a sweeper hub 68 having a central motor attachment hub 70 with four extensions 72, each having a pair of hinge knuckles 74 for cooperation with a complimentary pair of hinge knuckles 76 affixed by gussets 54 to the inner end of the screen sweepers 82. The two pairs of hinge knuckles 74, 76 are connected by a double knuckle 78 and two hinge pins 80 to provide a double pin hinge for increased flexibility in the pivot joint.

Figure 10:
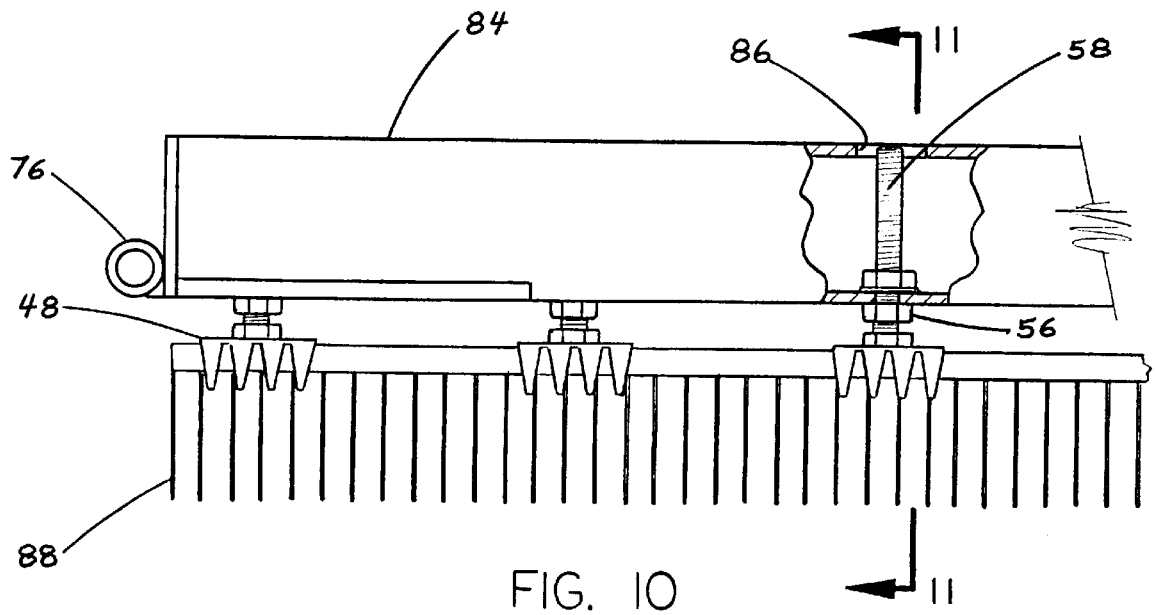
FIG. 10 is a side view, in partial section, of a screen sweeper.
Figure 11:
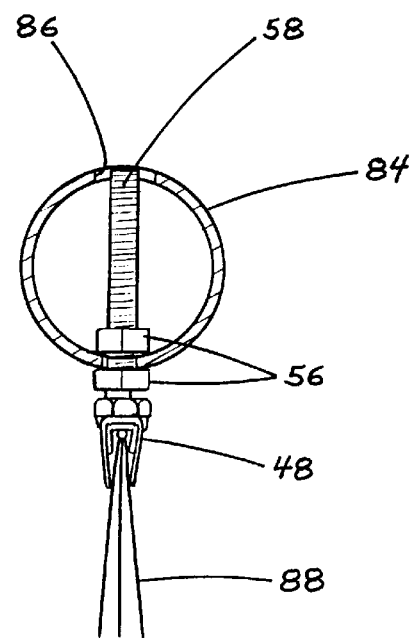
FIG. 11 is a sectional view of a screen sweeper taken along line 11—11 of FIG. 10.

Referring also to FIGS. 10 and 11, the screen sweepers 82 are comprised of an elongate tube 84 with an approximately 15 degree clockwise bend adjacent their inner end. The tube 84 has a series of brush-holder access holes 86 along its upper side to permit installation of a series of brush holders 48 within holes in the lower side of the tube 84. Each brush holder 48 has a stud 58 and is secured to the tube 84 by means of a pair of nuts 56. The brush holders 48 in turn are clamped to a sweeper brush 88 which then extends along the lower length of the brush holder 48 for contact with the conical intake screen 52. The sweeper brush 88 preferably has nylon bristles 0.045 inch in diameter.

Also shown in FIG. 7 is one of four lifting lugs 90 which are secured around the circumference of the motor plate 66 to permit the invention to be lifted by a crane for installation in a waterway. The lifting lugs 90 include a pair of bolts 92 having a cross-member 94 secured between them, and which are attached to the motor plate 66 and the cap plate 32. The cross-member 94 carries a lifting ring 96 which moves freely on the cross-member 94 for attachment to a crane hook.

Figure 8:
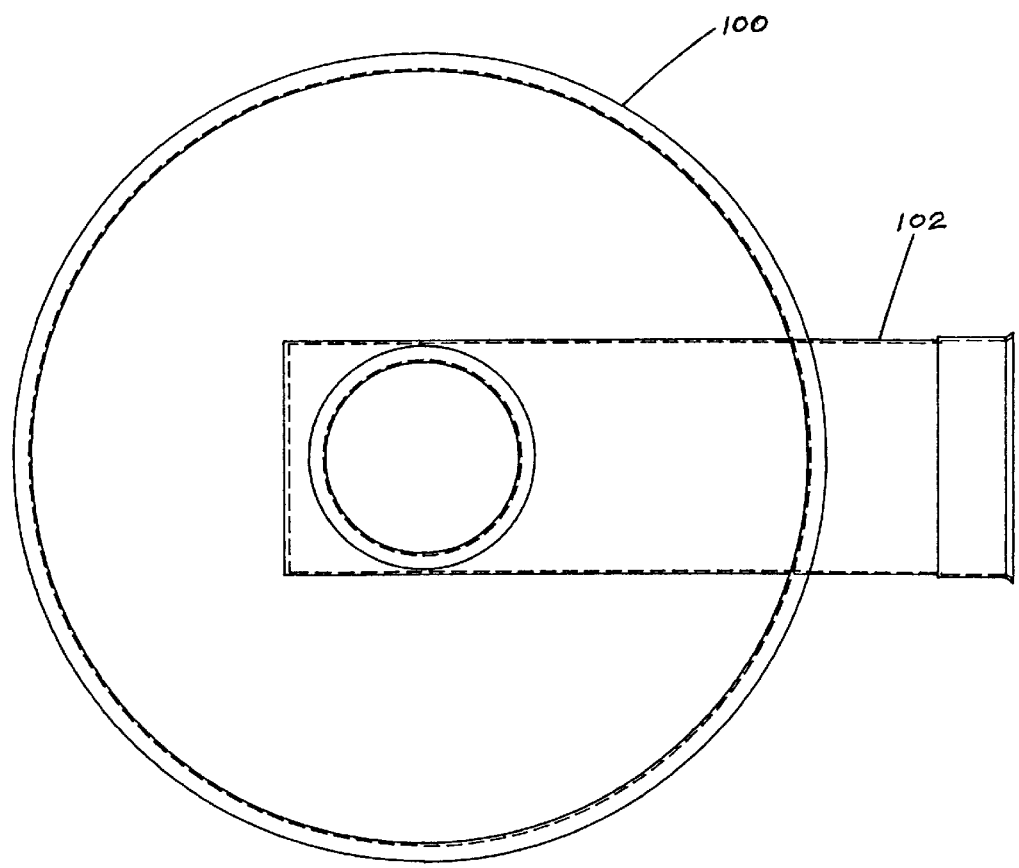
FIG. 8 is a top plan view of a base and outlet pipe for the invention.
Figure 9:
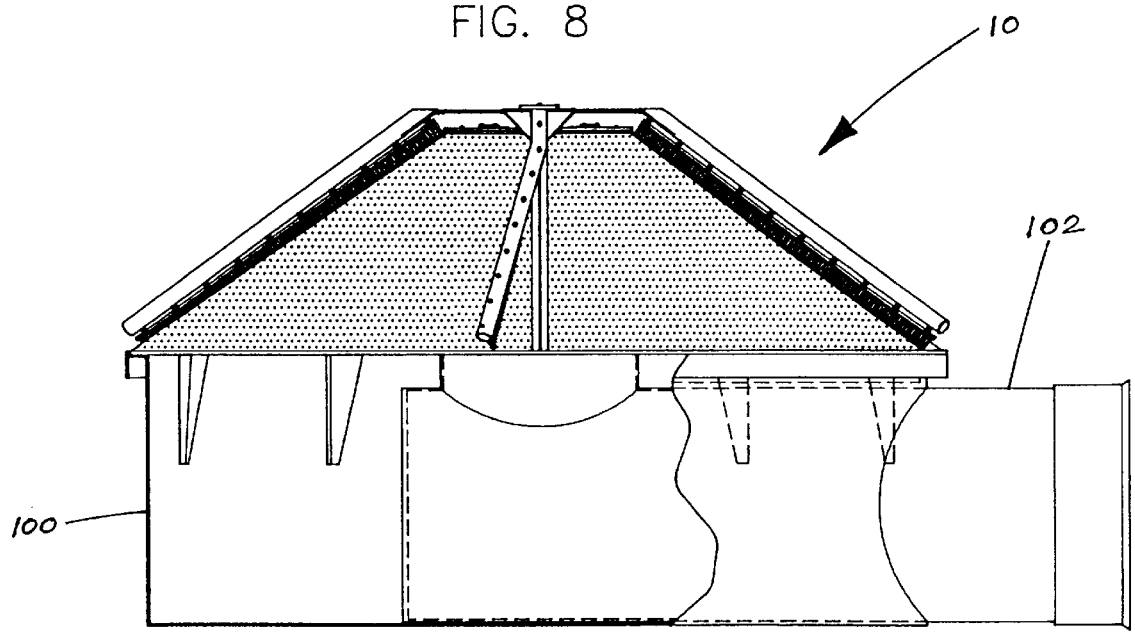
FIG. 9 is a side view, in partial section, showing the invention resting on the base of FIG. 8.

Referring now to FIGS. 8 and 9, a typical installation of a first embodiment of the invention 10 is depicted in a circular fiberglass or concrete tank 100 having an outlet pipe 102. As seen in FIG. 9, the invention 10 is placed on top of the tank 100 with the circular base 26 resting on the upper edge of the tank whereby only filtered water may enter the tank 100 and be carried away by outlet pipe 102.

Figure 12:
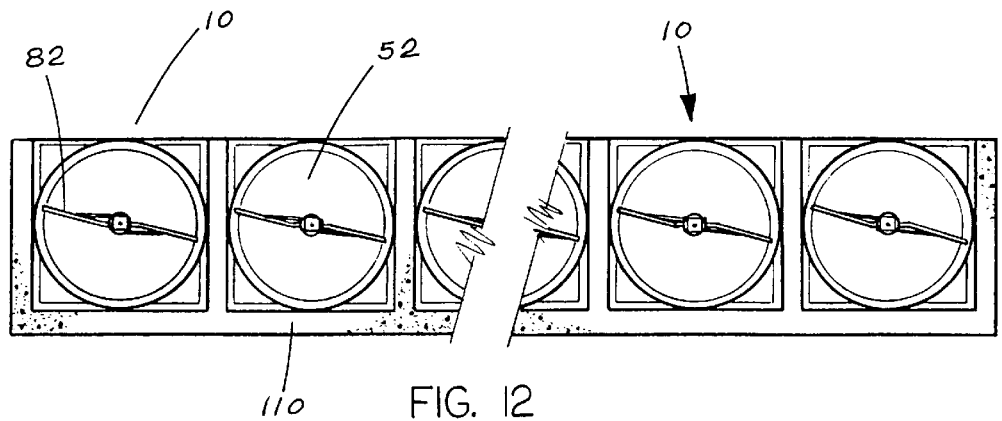
FIG. 12 depicts the installation of a series of second embodiments of the invention.
Figure 13:
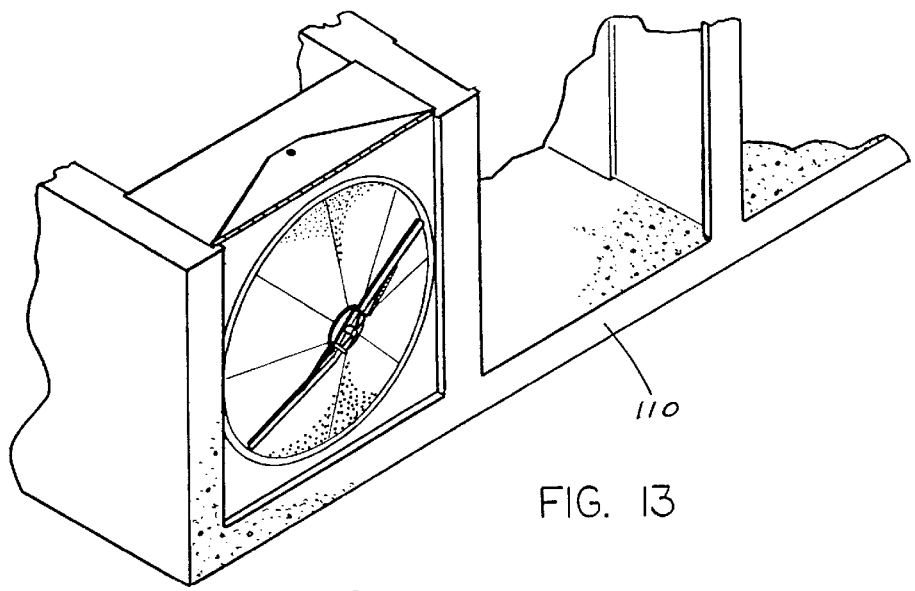
FIG. 13 is a perspective view of the second embodiment in place in a concrete embankment.
Figure 14:
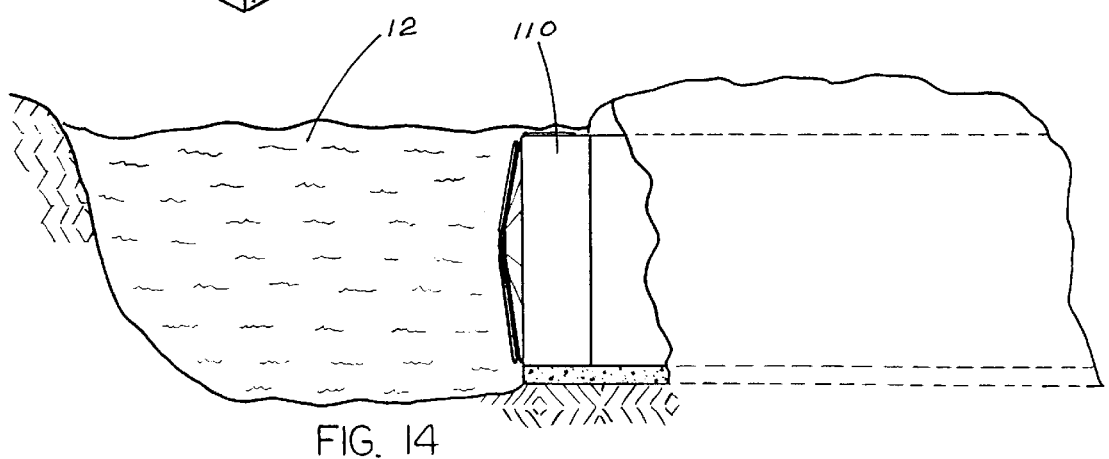
FIG. 14 is a side sectional view of the second embodiment in use.

A second embodiment of the invention is shown in FIGS. 12, 13, and 14. One or more of the self-cleaning intake screens 10 are placed in a concrete embankment 110 along a waterway 12 and filter the water as it passes horizontally through the intake screens and into a canal, pumping bay, or other water storage facility. The conical screens 52 of this embodiment utilize a much lower angle of approximately three degrees instead of the 35 degree slope of the first embodiment. The only other primary difference is that the screen sweepers 82 are spring loaded for engagement with the screen 52 and utilize a gauge wheel on the outer end of the screen sweeper to prevent flattening or excessive bending of the brush bristles.

Operation

The motor of the invention will typically operate at one revolution per minute, in a programmable sequence of directions and times as necessary for the amount of debris encountered in the waterway. One exemplary program might involve three counterclockwise revolutions (the forward direction), followed by one clockwise revolution, every hour. As the screen sweepers moves across the screen, they gather debris that has collected on the screen surface, pushing some ahead of the brush bristles and breaking up some of the material, allowing it to pass through the screen. The conical shape of the intake screen and the fact that the screen sweepers are angled rearwardly of the sweeping direction tends to work the debris down the sides of the cone and off the lower edge of the screen. When the screen sweeper encounters the brush cleaner, the smaller diameter bristles of the sweeper brush pass through the bristles of the cleaning brush, allowing debris and algae to be raked out of the sweeper brush and carried away by flowing water.

Although only two exemplary embodiments of the invention have been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A self-cleaning intake screen for preventing debris, fish, and other wildlife from being transferred from a waterway, comprising:
   a conical support structure having a circular base, a cap plate, and a plurality of support studs extending therebetween;
   a screen extending between said base and said cap plate and affixed to said support studs; and
   a screen sweeping assembly secured to said cap plate, wherein said screen sweeping assembly comprises a motor operably connected to a sweeper hub, and a plurality of elongate screen sweepers pivotably attached to said sweeper hub.

2. The self-cleaning intake screen as recited in claim 1 wherein said elongate screen sweepers are angled rearwardly from their forward direction of travel.

3. The self-cleaning intake screen as recited in claim 1 wherein said motor is programmable to selectively drive said screen sweepers both clockwise and counterclockwise for a selectable number of revolutions and at selectable intervals.

4. The self-cleaning intake screen as recited in claim 1 wherein said screen sweepers are spring-biased against said screen during cleaning operations.

5. A self-cleaning intake screen for preventing debris, fish, and other wildlife from being transferred from a waterway, comprising:
   a conical support structure having a circular base, a cap plate, and a plurality of support studs extending therebetween;
   a screen extending between said base and said cap plate and affixed to said support studs;
   a screen sweeping assembly secured to said cap plate; and
   a brush cleaner extending between said circular base and said cap plate and protruding above said screen for periodic engagement with said screen sweeping assembly.

* * * * *

UNITED STATES PATENT AND TRADEMARK OFFICE
Certificate

Patent No. 5,851,087            Patented: December 22, 1998

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Russell M. Berry III, Clovis, CA; and Francis E. Borcalli, Sacramento, CA.

Signed and Sealed this First Day of February, 2000.

DAVID J. BAGNELL
*Supervisory Patent Examiner*
Art Unit 3672